US008720997B2

(12) United States Patent
Kalinowski

(10) Patent No.: US 8,720,997 B2
(45) Date of Patent: May 13, 2014

(54) SEAT LATCH INDICATOR

(75) Inventor: David Kalinowski, Ferndale, MI (US)

(73) Assignee: Nissan North America, Inc., Franklin, TN (US)

( * ) Notice: Subject to any disclaimer, the term of this patent is extended or adjusted under 35 U.S.C. 154(b) by 74 days.

(21) Appl. No.: 13/406,596

(22) Filed: Feb. 28, 2012

(65) Prior Publication Data
US 2013/0221726 A1    Aug. 29, 2013

(51) Int. Cl.
*B60N 2/005* (2006.01)
*B60N 2/015* (2006.01)

(52) U.S. Cl.
USPC ............................ 297/336; 297/331; 297/335

(58) Field of Classification Search
USPC .................. 297/331, 332, 333, 334, 335, 336
See application file for complete search history.

(56) References Cited

U.S. PATENT DOCUMENTS

| | | | | |
|---|---|---|---|---|
| 3,880,464 A * | 4/1975 | Murphy et al. | ........... | 297/331 X |
| 5,195,802 A * | 3/1993 | Hayakawa et al. | ........... | 297/335 |
| 5,547,242 A * | 8/1996 | Dukatz et al. | ........... | 297/463.1 X |
| 5,855,414 A | 1/1999 | Daniel et al. | | |
| 6,170,913 B1 * | 1/2001 | Seibold et al. | ................ | 297/335 |
| 6,349,959 B2 | 2/2002 | Schlegel et al. | | |
| 6,412,849 B1 * | 7/2002 | Fast | ........... | 297/336 X |
| 6,742,841 B1 * | 6/2004 | Soditch et al. | ................ | 297/335 |
| 6,945,585 B1 * | 9/2005 | Liu et al. | ................... | 297/336 X |
| 7,198,316 B2 * | 4/2007 | Lutzka et al. | ............. | 297/336 X |
| 7,213,881 B2 * | 5/2007 | Kim et al. | ..................... | 297/336 |
| 7,325,876 B2 * | 2/2008 | Lavoie et al. | ............ | 297/335 X |
| 7,410,217 B2 * | 8/2008 | Inoue et al. | ............. | 297/378.13 |
| 7,431,371 B2 * | 10/2008 | Miller et al. | .............. | 297/336 X |
| 7,490,908 B2 * | 2/2009 | Wieclawski | ............. | 297/336 X |
| 7,528,709 B1 | 5/2009 | Maggiora | | |
| 7,658,447 B2 * | 2/2010 | Soditch et al. | ................ | 297/335 |
| 7,901,005 B2 * | 3/2011 | Khan et al. | .................... | 297/331 |
| 8,035,504 B2 | 10/2011 | White | | |
| 8,328,282 B2 * | 12/2012 | Maeda et al. | ................. | 297/331 |
| 8,333,530 B2 * | 12/2012 | Omori | ....................... | 297/336 X |
| 8,408,648 B2 * | 4/2013 | Champ | ........................ | 297/335 |
| 2001/0033492 A1 | 10/2001 | Rogers et al. | | |
| 2005/0057081 A1 * | 3/2005 | Kahn et al. | .................... | 297/331 |
| 2005/0077770 A1 * | 4/2005 | Lang et al. | .................... | 297/331 |
| 2005/0194826 A1 * | 9/2005 | O'Callaghan et al. | ... | 297/378.13 |
| 2006/0061184 A1 * | 3/2006 | Jennings | ................. | 297/378.12 |
| 2006/0108847 A1 * | 5/2006 | O'Callaghan et al. | ..... | 297/344.1 |

(Continued)

FOREIGN PATENT DOCUMENTS

DE    29811388 U1    11/1999
DE    10142486 A1    3/2003

(Continued)

*Primary Examiner* — Rodney B White
(74) *Attorney, Agent, or Firm* — Young, Basile, Hanlon & MacFarlane, P.C.

(57) ABSTRACT

Disclosed herein are embodiments of a latching mechanism for a vehicle seat. An exemplary latching mechanism for allowing selective attachment and detachment of a vehicle seat comprises a latch configured for latching and unlatching the seat, the latch being biased to a latched condition. The latching mechanism also comprises a lock for locking the latch and releasing the latch, the lock having a locked position, a transition position and a release position and configured for movement from the locked position to the release position through the transition position. The latching mechanism further comprises an indicator responsive to the position of the lock and configured to activate indication that the latch is released when the lock is moved through the transition position.

20 Claims, 8 Drawing Sheets

(56) References Cited

U.S. PATENT DOCUMENTS

| | | |
|---|---|---|
| 2006/0284464 A1* | 12/2006 | Soditch et al. .............. 297/331 |
| 2007/0246985 A1* | 10/2007 | Sahi ............................ 297/331 |
| 2008/0084073 A1 | 4/2008 | Willing et al. |
| 2010/0032997 A1 | 2/2010 | Gold et al. |

FOREIGN PATENT DOCUMENTS

| | | |
|---|---|---|
| DE | 10310848 A1 | 9/2004 |
| GB | 2429401 A | 2/2007 |
| JP | 2001097099 A | 4/2001 |

* cited by examiner

US 8,720,997 B2

SEAT LATCH INDICATOR

TECHNICAL FIELD

The embodiments disclosed herein generally relate to vehicle seats equipped with latching mechanisms for allowing selective attachment and detachment of the vehicle seat with respect to a vehicle.

BACKGROUND

In order to increase the flexibility and usability of the interior cabin space within a vehicle, a vehicle seat can be equipped with a latching mechanism configured for selective detachment from and attachment to the vehicle, which in turn allows for selective removal and reinstallation of the vehicle seat. The latching mechanism can include components for latching the vehicle seat to the vehicle, as well as components for locking the latching mechanism into a latched condition in order to prevent undesired detachment of the vehicle seat.

SUMMARY

Disclosed herein are embodiments of a latching mechanism for a vehicle seat. In one aspect, a latching mechanism for allowing selective attachment and detachment of a vehicle seat comprises a latch configured for latching and unlatching the seat, the latch being biased to a latched condition. The latching mechanism also comprises a lock for locking the latch and releasing the latch, the lock having a locked position, a transition position and a release position and configured for movement from the locked position to the release position through the transition position. The latching mechanism further comprises an indicator responsive to the position of the lock and configured to activate indication that the latch is released when the lock is moved through the transition position.

In another aspect, a vehicle seat for vehicle comprises a latch configured for movement between a latched condition and an unlatched condition, the latch being biased for movement towards the latched condition. The vehicle seat also comprises a cam configured for selective engagement with the latch for selectively maintaining the latch in a locked state wherein the latch is locked in the latched condition and a released state wherein the latch is released from the latched condition, wherein the cam is configured for movement from a locked position to a release position through a transition position, the cam maintaining the latch in the locked state during movement from the locked position to the transition position and releasing the latch to the released state at the release position. The vehicle seat further comprises an indicator responsive to movement of the cam to activate indication of the released state upon movement of the cam through the transition position.

These and other aspects will be described in additional detail below.

BRIEF DESCRIPTION OF THE DRAWINGS

The various features, advantages and other uses of the present apparatus will become more apparent by referring to the following detailed description and drawing in which.

DETAILED DESCRIPTION

Disclosed herein are embodiments of a vehicle seat having a latching mechanism that allows for selective attachment to and detachment from a vehicle in which the vehicle seat is installed. The exemplary latching mechanism includes an indicator capable of providing an accurate indication of the attachment status of the vehicle seat based upon the state of the latching mechanism.

Figure 1:
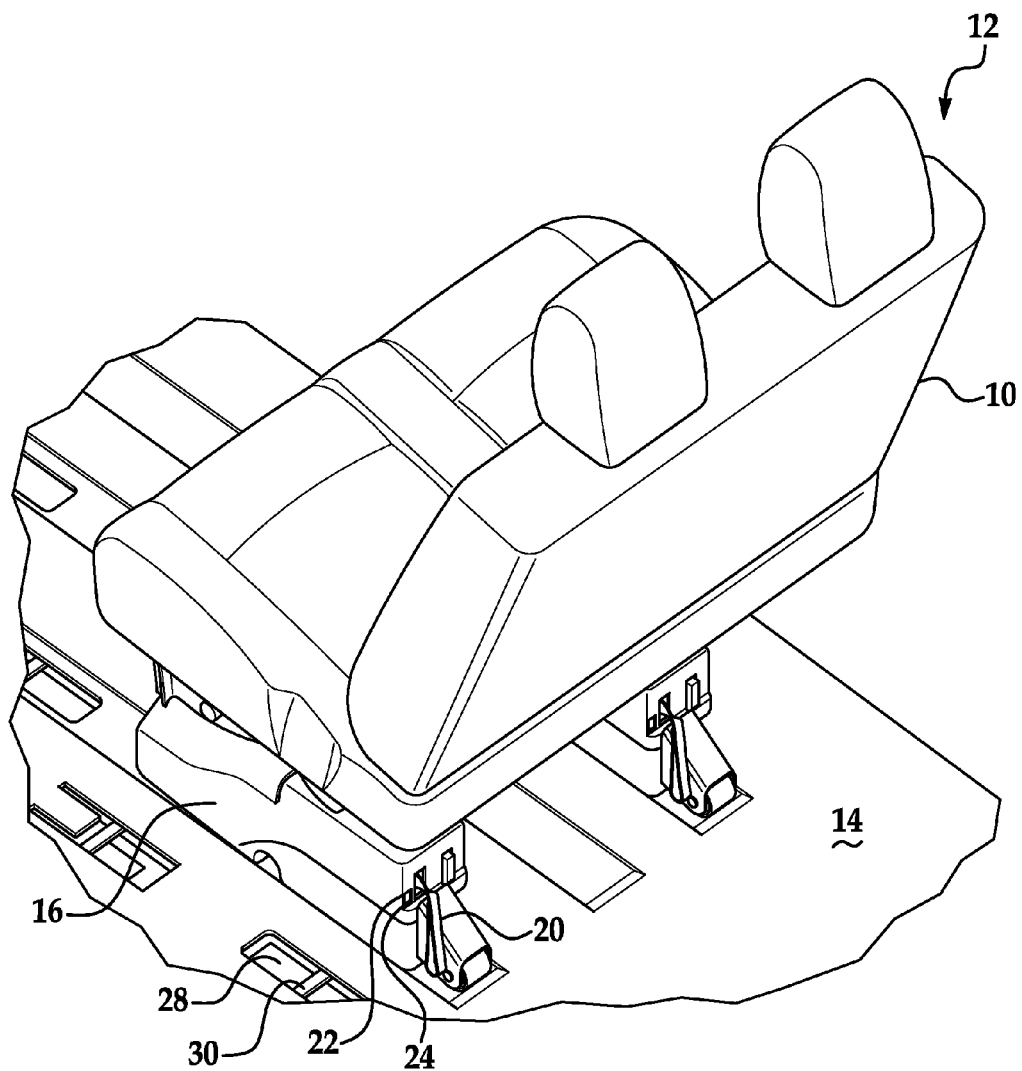
FIG. 1 is a perspective view of a vehicle seat positioned within an interior cabin of a vehicle.
Figure 2:
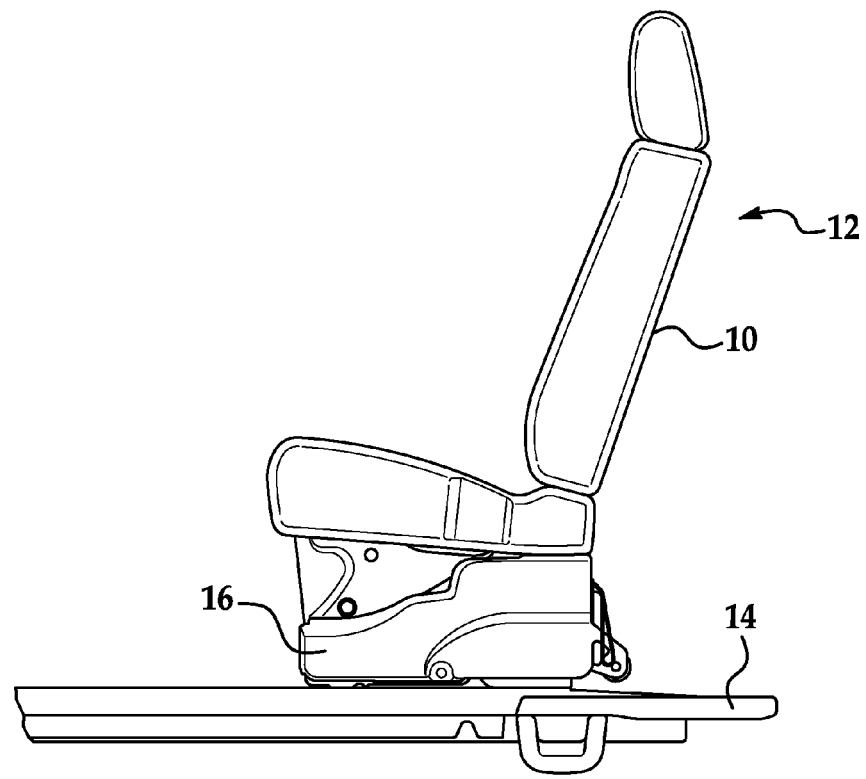
FIG. 2 is a side view of the vehicle seat shown in FIG. 1 showing an example of a housing for enclosing a latching mechanism.

An example of a vehicle seat 10 is shown in FIGS. 1 and 2. The vehicle seat 10 is configured for installation within an interior cabin 12 of a vehicle. In addition to having a vehicle seat 10 for providing seating space for occupants, the interior cabin 12 also provides space suitable for the storage of various cargo items. A typical user of the vehicle will encounter demand to utilize the space within the interior cabin 12 for both occupant seating and cargo storage at different times depending on the usage of the vehicle. The flexibility and overall usability of the interior cabin 12 can be improved by providing a vehicle seat 10 that can be removed from, or installed into, the interior cabin 12 as the demand for space changes.

The illustrated vehicle seat 10 can be configured for selective detachment from, and attachment to, a vehicle frame 14 that at least partially defines the interior cabin 12. If, for instance, a user of the vehicle desires to increase the cargo capacity of the interior cabin 12, the vehicle seat 10 can be detached from the vehicle frame 14 and removed from the interior cabin 12. Conversely, if the user later desires increased seating capacity, the vehicle seat 10 can be repositioned into the interior cabin 12 and reattached to the vehicle frame 14. Although the selective detachment and attachment of the vehicle seat 10 is described with reference to a vehicle frame 14, the vehicle seat 10 could alternatively be configured for selective detachment from and attachment to other vehicle mounting structures.

Figure 3:
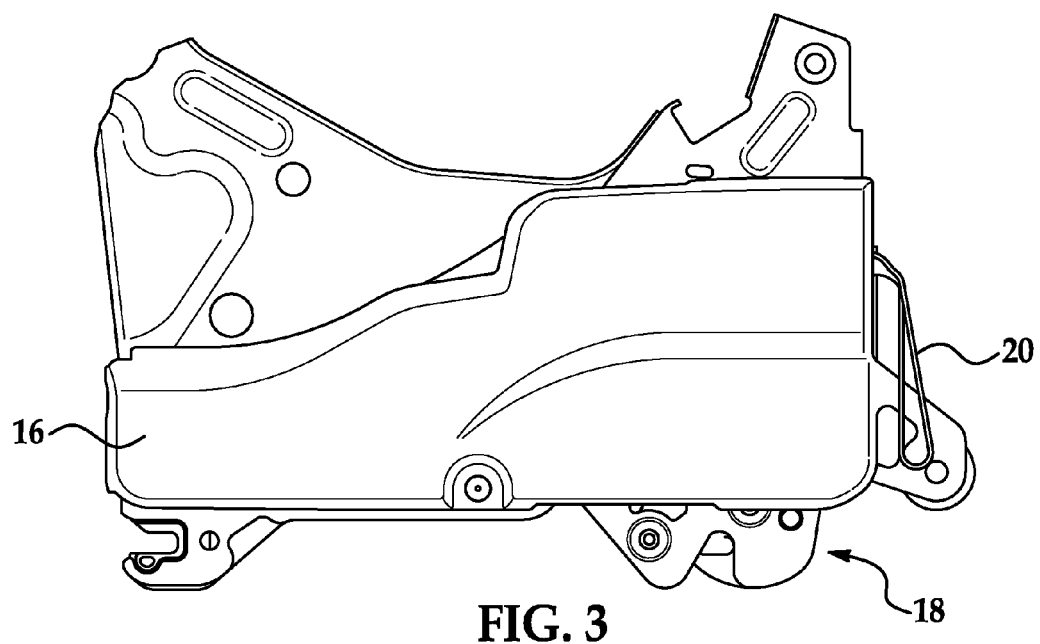
FIG. 3 is an enlarged side view of the housing shown in FIG. 2.

As shown in FIGS. 1-3, the vehicle seat 10 can include a housing 16 for enclosing a latching mechanism 18. The latching mechanism 18 is configured for selective attachment and detachment with respect to the vehicle frame 14. When the vehicle seat 10 is equipped with the latching mechanism 18, the latching mechanism 18 allows for attachment of the vehicle seat 10 to the vehicle frame 14 when in a latched condition, and allows for detachment of the vehicle seat 10 from the vehicle frame 14 when in an unlatched condition. In addition, the latching mechanism 18 can also have a locked state, in which the latching mechanism 18 is locked into the latched condition, and a released state, in which the latching mechanism 18 is released from the latched condition. In the locked state, with the latching mechanism 18 locked into the latched condition, the vehicle seat 10 is secured to the vehicle frame 14 and can be used to provide seating space for occupants of the vehicle. In the released state, the latching mechanism 18 is permitted to unlatch from the vehicle frame 14, which allows for the vehicle seat 10 to be removed from the interior cabin 12.

The latching mechanism 18 can be generally manipulated through an operator input, which is illustrated as a pull strap 20 extending from the housing 16. The pull strap 20 is provided as a non-limiting example and other operator inputs known to those skilled in the art are contemplated. The illustrated housing 16 can also house an indicator 22, which is configured to indicate the attachment status of the vehicle seat 10 to a user of the vehicle based upon the state of the latching mechanism 18. For example, when the vehicle seat 10 is positioned within the vehicle and oriented correctly with respect to the vehicle frame 14 to allow for attachment of the latching mechanism 18 to the vehicle frame 14, the indicator 22 can be configured to indicate whether the latching mechanism 18 is in the locked state or in the released state, for example, and/or whether the latching mechanism 18 is in an intermediate state.

As described in greater detail below, the illustrated implementation of the indicator 22 is shown in a non-limiting example as being mechanically responsive to the state of the latching mechanism 18 to indicate the attachment status of the vehicle seat 10. However, the indicator 22 could alternatively be responsive to, for example, one or more electronic sensors configured to sense the state of the latching mechanism 18. The illustrated implementation of the indicator 22 is further shown in the non-limiting example as providing a visual indication of the attachment status of the vehicle seat 10 through selective positioning with respect to an indicator window 24 defined by the housing 16. However, the attachment status of the vehicle seat 10 could alternatively be indicated with an indicator light, for example, or other electronic displays known to those skilled in the art. The illustrated indicator 22 is positioned adjacent the pull strap 20, but could alternatively be positioned elsewhere on the housing 16, elsewhere on the vehicle seat 10, or in another location within the vehicle and visible to a user, such as on an instrument panel, using a transmitter to transmit the attachment status electronically.

Figure 4:
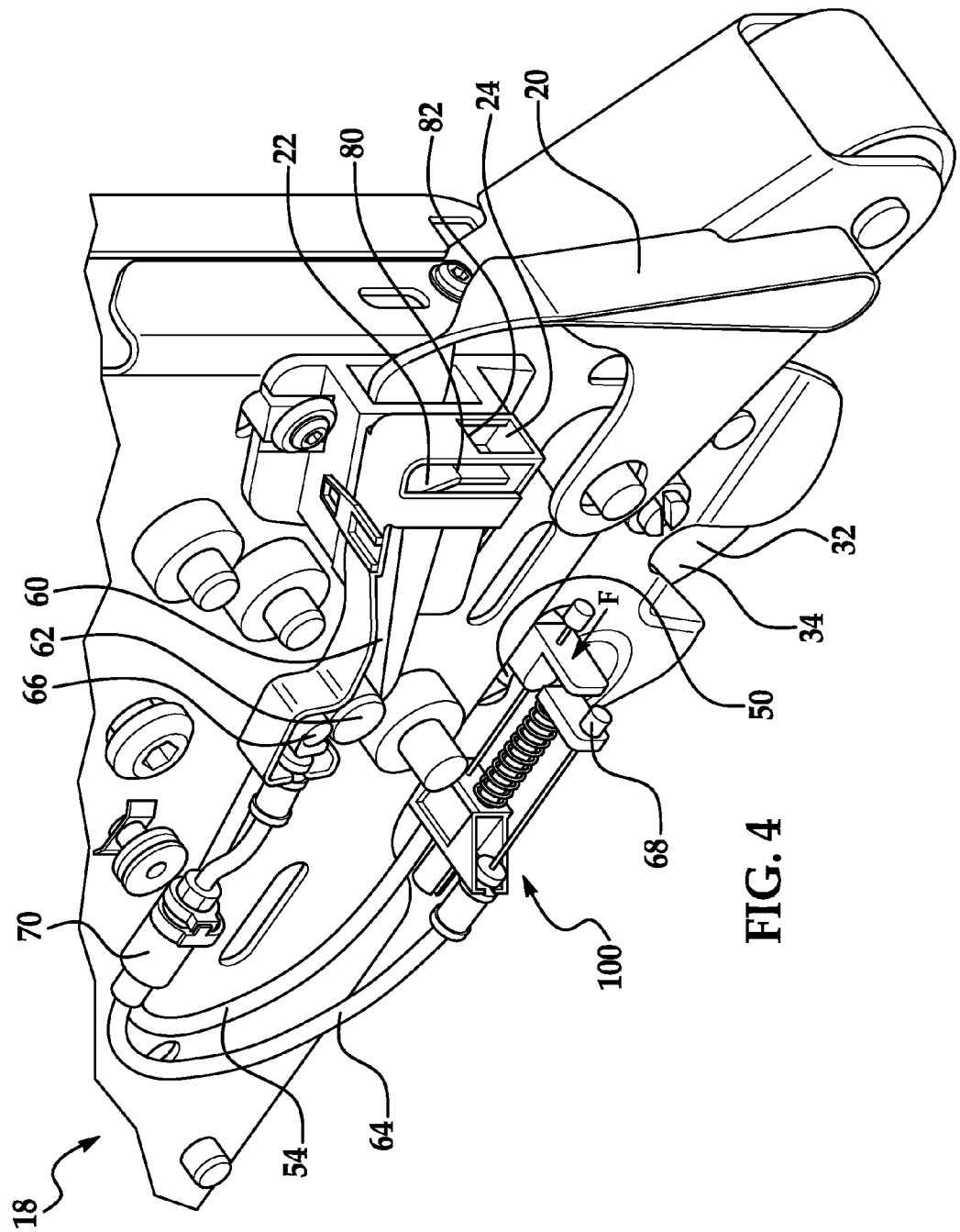
FIG. 4 is a perspective view of a latching mechanism including an indicator enclosed within the housing shown in FIG. 3.
Figure 5:
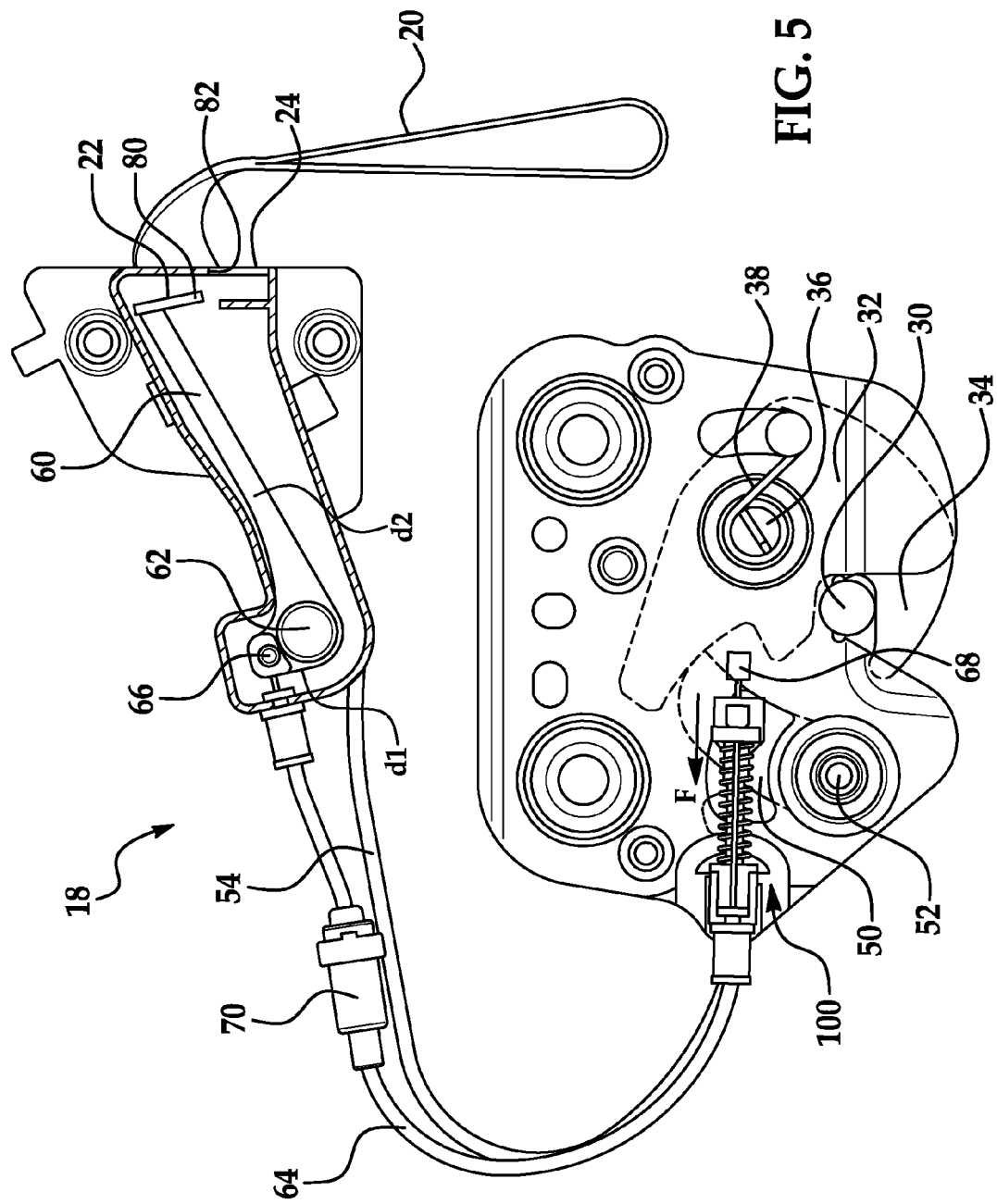
FIG. 5 is a partial side sectional view of the latching mechanism shown in FIG. 4.

The operation of the latching mechanism 18 can be understood with reference to FIGS. 4 and 5. The latching mechanism 18 can be selectively attached to and detached from the vehicle frame 14. The illustrated vehicle frame 14 can define a latch receiver 28 (an example of which is shown in FIG. 1) for receiving a portion of the latching mechanism 18, and the vehicle frame 14 can include a striker 30 extending across the latch receiver 28. The latching mechanism 18 includes a latch 32, which is a mechanical latch configured for selective engagement and disengagement with the striker 30. The latching mechanism 18 is in an unlatched condition when the latch 32 is disengaged from the striker 30 and is in a latched condition when the latch 32 is engaged with the striker 30. The latch 32 defines a pawl 34 for engaging the striker 30, although other configurations known to those skilled in the art could alternatively be used for engaging the striker 30. The latch 32 is configured for movement into and out of engagement with the striker 30 through rotation about a latch pin 36, and can be biased for movement out of engagement with the striker 30 through coupling to a latch spring 38.

The latching mechanism 18 also includes a lock for operating the latching mechanism 18 between a locked state, in which the latching mechanism 18 is locked into the latched condition, and a released state, in which the latching mechanism 18 is released from the latched condition. The lock is illustrated as a cam 50. The cam 50 is configured for movement into and out of engagement with the latch 32 through rotation about a cam pin 52 to operate the latching mechanism 18 between the locked state and the released state. In order to maintain the latching mechanism 18 in the locked state, the cam 50 can engage (or otherwise contact in a restricting manner) the latch 32 to prohibit movement of the latch 32 out of engagement with the striker 30. Similarly, in order to manipulate the latching mechanism 18 into the released state, the cam 50 can disengage from the latch 32 to allow movement of the latch 32 out of engagement with the striker 30. The cam 50 can also be biased for movement into engagement with the latch 32 through coupling to a cam spring (not shown). The pull strap 20 is coupled to the cam 50 through a cam cable 54, which is illustrated as a push/pull cable, although alternative couplings between an operator input and the cam 50 could be used to directly or indirectly control movement of the cam 50.

As shown, the latching mechanism 18 is fully included in the vehicle seat 10, and the striker 30 is coupled to the vehicle frame 14. However, other configurations could alternatively be used. For example, the striker 30 could be coupled to the vehicle seat 10 and the latching mechanism 18 could be included in the vehicle frame 14. Further, one or more of the described components of the latching mechanism 18 could be distributed elsewhere within the vehicle seat 10 and/or the vehicle frame 14. In addition, other configurations of the latch 32 and/or cam 50 known to those skilled in the art could be used control the state of the latching mechanism 18.

The latching mechanism 18 is illustrated in FIGS. 4 and 5 in a static locked state. In the static locked state, the latch 32 is engaged with the striker 30, placing the latching mechanism 18 in the latched condition. Further, the cam 50 is positioned into engagement with the latch 32, which prevents rotational movement of the latch 32 out of engagement with the striker 30, locking the latch 32 in the latched condition. Engagement between the cam 50 and the latch 32 maintains the latching mechanism 18 in the locked state, which secures the latching mechanism 18 to the striker 30, thereby securely attaching the vehicle seat 10 to the vehicle frame 14.

The cam 50 is biased for movement into engagement with the latch 32, which maintains the latching mechanism 18 in the locked state under static conditions. However, the cam 50 is coupled to the pull strap 20 through the cam cable 54, and is configured for movement out of engagement with the latch 32 in response to a user operating the pull strap 20. When the pull strap 20 is withdrawn from the housing 16, the cam cable 54 is retracted, the bias for movement of the cam 50 into engagement with the latch 32 is overcome, and the cam 50 is rotated about the cam pin 52 out of engagement with the latch 32. Disengagement of the cam 50 from the latch 32 manipulates the latching mechanism 18 into the released state. In the released state, the latch spring 38 urges the latch 32 out of engagement with the striker 30 through movement about the latch pin 36, placing the latching mechanism 18 into the unlatched condition. In the unlatched condition, the latching mechanism 18 is unlatched from the striker 30, thereby allowing for the vehicle seat 10 to be detached from the vehicle frame 14 and removed from the interior cabin 12.

When the latching mechanism 18 is unlatched from the striker 30, the latch spring 38 causes the latch 32 to remain open for subsequent receipt of the striker 30. To reattach the vehicle seat 10 to the vehicle frame 14, the open latch 32 is pressed into contact with the striker 30. The latch 32 is thereby compelled to rotate about the latch pin 36 into engagement with the striker 30, placing the latching mechanism 18 in the latched condition. The cam 50 is then freed for biased rotation about the cam pin 52 into engagement with the latch 32 to place the latching mechanism 18 into the illustrated static locked state.

The illustrated indicator 22 is responsive to the state of the latching mechanism 18 to indicate the attachment status of the vehicle seat 10. In the illustrated implementation, the indicator 22 is configured for indicating at least one of the locked state, the released state and/or an intermediate state of the latching mechanism 18 through selective positioning with respect to the indicator window 24 defined by the housing 16. The indicator 22 is located with respect to the indicator window 24 for positioning between a position indicative of the locked state and a position indicative of the released state, and can also be configured for corresponding intermediate positioning. The indicator 22 can be red in color, for example, and positionable into alignment with the indicator window 24 to indicate the released state of the latching mechanism 18 and positionable out of alignment with the indicator window 24 to indicate the locked state of the latching mechanism 18. In this example, when the indicator 22 is positioned into alignment with the indicator window 24, red is shown through the indicator window 24 to indicate that the vehicle seat 10 is not securely attached to the vehicle frame 14. When the indicator 22 is positioned out of alignment with the indicator window 24, the indicator 22 is not shown through the indicator window 24, which indicates that the vehicle seat 10 is securely attached to the vehicle frame 14.

As explained above, in the illustrated latching mechanism 18, the cam 50 is configured to operate the latching mechanism 18 between the locked state and the released state as it rotates about the cam pin 52. The indicator 22 can correspondingly be configured to be positionable in response to movement of the cam 50 to indicate the attachment status of the vehicle seat 10.

As shown, the indicator 22 is supported adjacent the indicator window 24 by an indicator arm 60. The indicator arm 60 is configured for rotation about an indicator pin 62, and can support the indicator 22 for movement relative to the indicator window 24. For example, the indicator arm 60 can support the indicator 22 for positioning into and out of alignment with the indicator window 24 to indicate the locked state, the released state and/or an intermediate state of the latching mechanism 18.

As explained in greater detail below with reference to FIG. 8, the indicator arm 60 can be biased for movement to position the indicator 22 out of alignment with the indicator window 24 in the illustrated static locked state. The illustrated indicator arm 60 is also coupleable to the cam 50 through an indicator cable 64. The indicator cable 64 has a first end 66 coupled to the indicator arm 60 and a second end 68 selectively coupleable to the cam 50. The indicator cable 64 can also include a cable adjuster 70 positioned between the first end 66 and second end 68 for removing slack in the indicator cable 64. When the second end 68 of the indicator cable 64 is coupled to the cam 50, the cam 50 applies a cam force F as it is rotated about the cam pin 52. As the cam 50 is rotated out of engagement with the latch 32 to manipulate the latching mechanism 18 to the released state, the cam force F is applied as a pushing force through the indicator cable 64 to the first end 66 of the indicator cable 64 and to the indicator arm 60. In response, the bias for movement of the indicator arm 60 to position the indicator 22 out of alignment with the indicator window 24 is overcome, and the indicator arm 60 is rotated about the indicator pin 62 to position the indicator 22 into alignment with the indicator window 24 to indicate the released state of the latching mechanism 18.

Figure 6A:
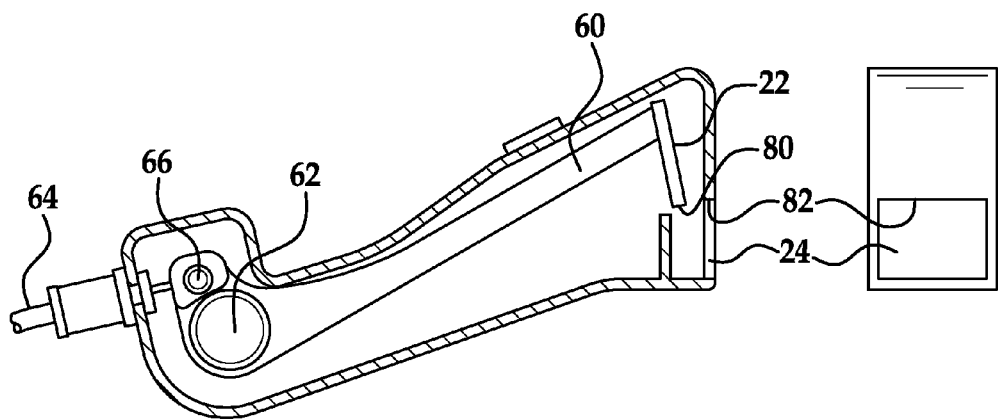
FIGS. 6A-6C are enlarged side sectional views showing details of an indicating function of the latching mechanism.
Figure 6B:
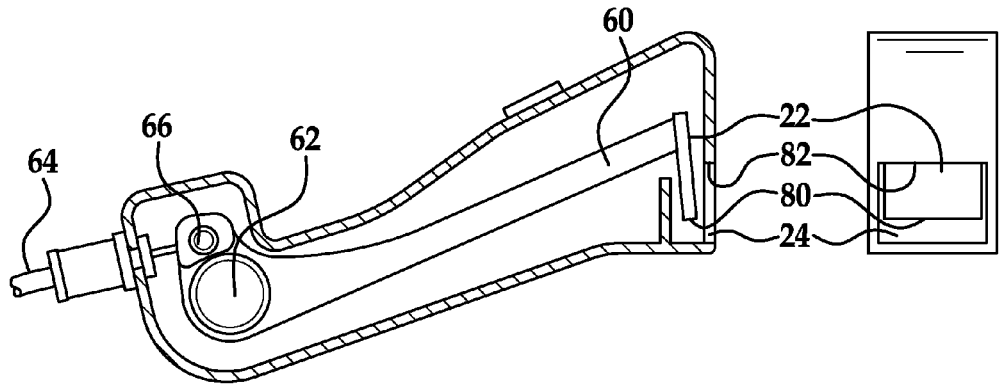
Figure 6C:
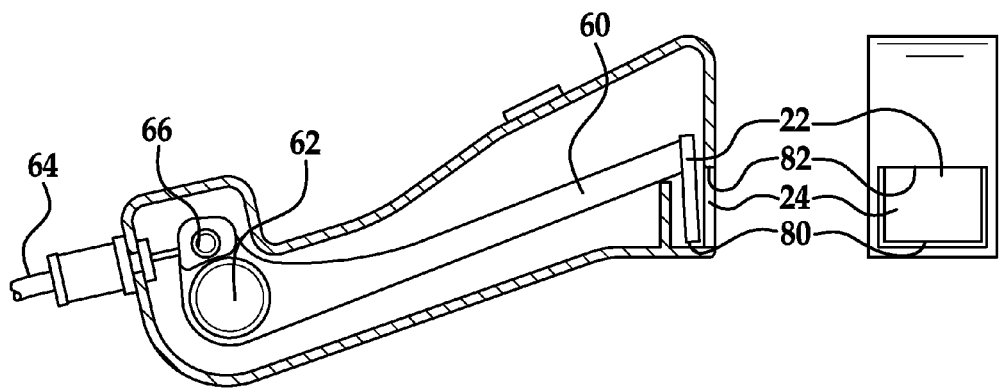

The indicator 22 is generally configured to accurately indicate the attachment status of the vehicle seat 10 based upon the state of the latching mechanism 18. As shown in FIG. 6A, the indicator 22 is positioned out of alignment with the indicator window 24 to indicate the locked state of the latching mechanism 18. A leading edge 80 of the indicator 22 can be positioned such that any rotation of the indicator arm 60 initiates indication of the released state of the latching mechanism 18. For example, the leading edge 80 can be positioned substantially adjacent a peripheral edge 82 of the indicator window 24. As the indicator arm 60 is rotated, indication of the released state of the latching mechanism 18 can be activated when the leading edge 80 of the indicator 22 is advanced into view through the indicator window 24 as it passes the peripheral edge 82 of the indicator window 24. As rotation of the indicator arm 60 about the indicator pin 62 continues, the indicator 22 is advanced towards alignment with the indicator window 24, as shown in FIG. 6B. As the indicator 22 is advanced by rotation of the indicator arm 60, the indicator 22 partially fills the indicator window 24 to indicate a transition between the locked state and the released state of the latching mechanism 18. As rotation of the indicator arm 60 about the indicator pin 62 further continues, the indicator 22 is advanced into substantial alignment with the indicator window 24, as shown in FIG. 6C, thereby filling the indicator window 24 to indicate a fully released state of the latching mechanism 18. While the indicator window 24 is illustrated as an opening defined by the peripheral edge 82, a separating structure could also be fixed to the peripheral edge 82 in any of a variety of ways. For example, the opening in the indicator window 24 could be occupied by a transparent panel made of glass, plastic, or another material in order to preserve operation of the indicator 22 while preventing small objects and debris from passing through the indicator window 24. Alternatively, a divider such as a bar, rod, or mesh could extend across the indicator window 24 in order to maintain the indicator 22 at a desired overall size while still limiting the passage of small objects through the indicator window 24.

Depending upon the amount of movement required of the cam 50 to move the cam 50 out of engagement with the latch 32, the desired size of the indicator window 24 and/or space constraints within the vehicle seat 10, among other design considerations, various configurations of an indicator arm 60 could be used. For example, the illustrated indicator arm 60 defines a first distance d1 from the indicator pin 62 to a point of attachment of the first end 66 of the indicator cable 64, and defines a second distance d2 from the indicator pin 62 to the indicator 22. When the indicator arm 60 is coupled to the cam 50 through the indicator cable 64, there is a 1:1 correspondence between movement of the cam 50 and movement of the second end 68 and the first end 66 of the indicator cable 64. In addition, for an indicator arm 60 configured for rotation about the indicator pin 62, a corresponding ratio d1:d2 between movement of the cam 50 and movement of the indicator 22 is defined. Although other overall configurations could be used to define other ratios, the illustrated configuration of the latching mechanism 18 can be used to define a ratio between movement of the cam 50 and movement of the indicator 22 of approximately 1:8.

In the illustrated implementation of the latching mechanism 18, the locked state and the released state, as well as a transition between the locked state and the released state, are controlled through the movement of the cam 50. The cam 50 is configured to rotate about the cam pin 52 through a range of individual positions in response to a user operating the pull strap 20. The motion of a distal end 90 of the cam 50, which is the portion of the cam 50 configured to engage the latch 32 to maintain the latching mechanism 18 in the locked state, is represented in FIGS. 7A-7D by the line of motion 92.

Figure 7A:
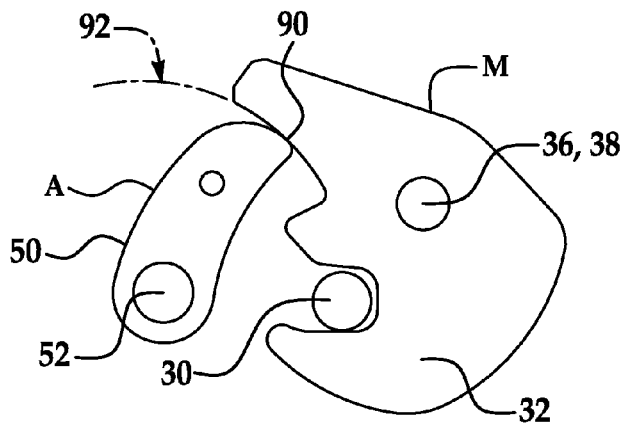
FIGS. 7A-7F are side views of the latching mechanism shown in FIGS. 4 and 5 showing details of latching and locking functions of the latching mechanism.
Figure 7B:
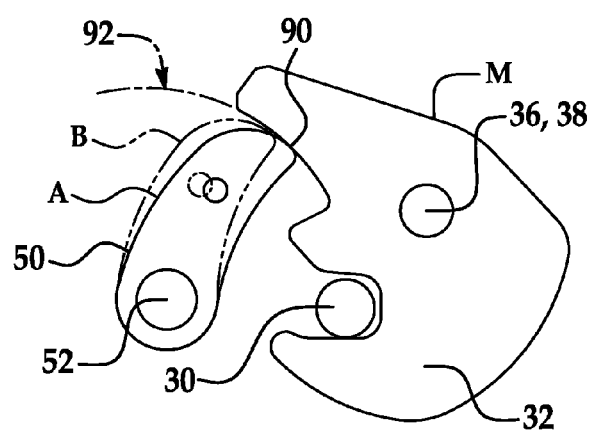
Figure 7C:
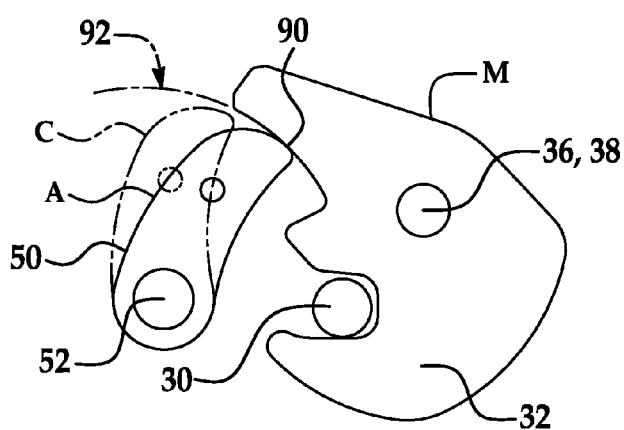
Figure 7D:
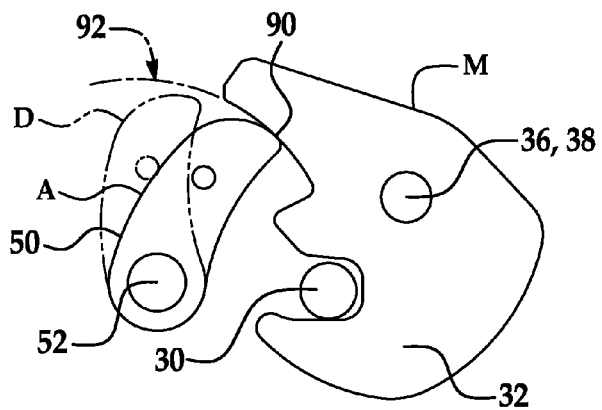

The cam 50 is shown in FIG. 7A in a locked position A. When the cam 50 is in the locked position A, the latching mechanism 18 is in a designed, or nominal, locked state, which is also illustrated in FIGS. 4 and 5. The cam 50 is shown in FIG. 7B along the line of motion 92 in a transition position B. When the cam 50 reaches the transition position B, the distal end 90 of the cam 50 continues to engage the latch 32. Although the latching mechanism 18 is not in the nominal locked state when the cam 50 reaches the transition position B, the distal end 90 of the cam 50 continues to maintain the latching mechanism 18 in a locked state. That is, the cam 50 maintains the latching mechanism 18 in a locked state during movement along the line of motion 92 from the locked position A to the transition position B. However, as the cam 50 is moved through the transition position B, the distal end 90 of the cam 50 disengages from the latch 32, manipulating the latching mechanism 18 into the released state. The distal end 90 of the cam 50 continues to disengage from the latch 32 to transition the latching mechanism 18 to the released state during movement along the line of motion 92 to a release position C, shown in FIG. 7C. Finally, the cam 50 is shown in FIG. 7D along the line of motion 92 in a full release, or over-travel position D.

Figure 7E:
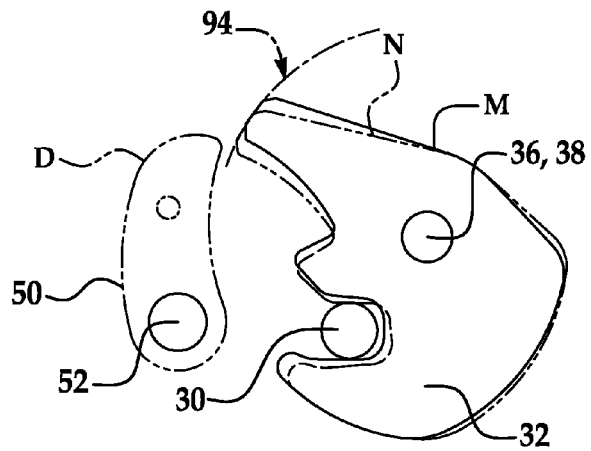
Figure 7F:
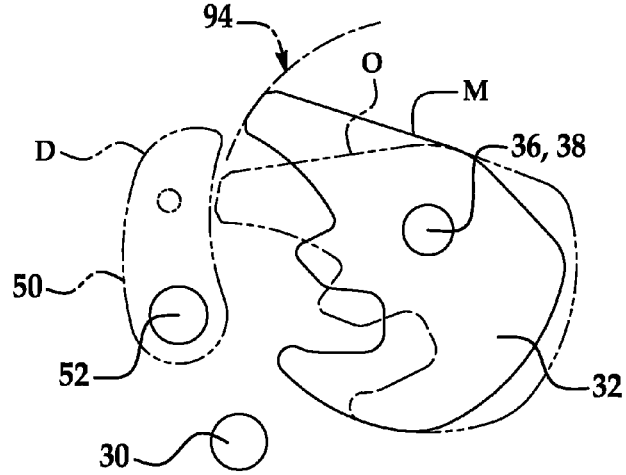

In FIGS. 7A-7D, the latch 32 is shown in a latched position M. In the latched position M, the latch 32 is engaged with the striker 30 to maintain the latching mechanism 18 in the latched condition. The latch 32 is also configured to rotate about the latch pin 36 through a range of individual positions to manipulate the latching mechanism 18 from the latched condition to an unlatched condition. The motion of the latch 32 about the latch pin 36, which can be compelled by the latch spring 38 and is permitted when the cam 50 is disengaged from the latch 32, is represented in FIGS. 7E and 7F by the line of motion 94. The cam 50 is shown for reference in the over-travel position D, although similar motion of the latch 32 along the line of motion 94 could occur when the cam 50 is in the release position C, for example, or when the cam 50 is in an intermediate position between the release position C and the over-travel position D.

The latch 32 is shown in FIG. 7E along the line of travel 94 in an unlatched position N. When the latch is in the unlatched position N, sufficient clearance is gained between the pawl 34 and the striker 30 to allow the latch 32 to disengage from the striker 30 as the latching mechanism 18 is pulled away from the latch receiver 28. The latching mechanism 18 could be pulled away from the latch receiver 28 in response to, for example, a user pulling the vehicle seat 10 away from the vehicle frame 14 after operating the pull strap 20 to manipulate the latching mechanism 18 into the released state, as explained above. As the latching mechanism 18 is pulled away from the latch receiver 28, the latch 32 fully disengages from the striker 30, placing the latching mechanism 18 into the unlatched condition. The latch 32 then continues to rotate about the latch pin 36 at the urging of the latch spring 38 to an open position O, as shown in FIG. 7F. With the latch 32 in the open position O, the latch 32 is open for receiving the striker 30. Additionally, the latch 32 engages the cam 50 to maintain the cam 50 in the over-travel position D.

With the latch 32 in the open position O, the latching mechanism 18 can be reattached to the latch receiver 28. The latch 32 can be pressed into contact with the striker 30, which compels the latch 32 to rotate about the latch pin 36 to the latched position M. In the latched position M, the latch 32 is engaged with the striker 30 to maintain the latching mechanism 18 in the latched condition. Further, in the latched position M, the latch 32 disengages from the cam 50. In the absence of a user operating the pull strap 20, the cam 50 is freed for biased movement into the locked position A, manipulating the latching mechanism 18 to the static locked state illustrated in FIGS. 4-5 and 7A.

For the indicator 22 to accurately indicate the state of the latching mechanism 18 as the latching mechanism 18 is released from the locked state, the indicator 22 can preferably be configured to activate indication that the latching mechanism 18 is in the released state only upon movement of the cam 50 through the transition position B. That is, the cam 50 and the indicator 22 can be arranged such that the indicator 22 does not prematurely activate indication that the latching mechanism 18 is in the released state. The illustrated implementation of a latching mechanism 18 includes a non-limiting example of an arrangement between the cam 50 and the indicator 22 that allows the indicator 22 to accurately indicate the state of the latching mechanism 18.

Figure 8A:
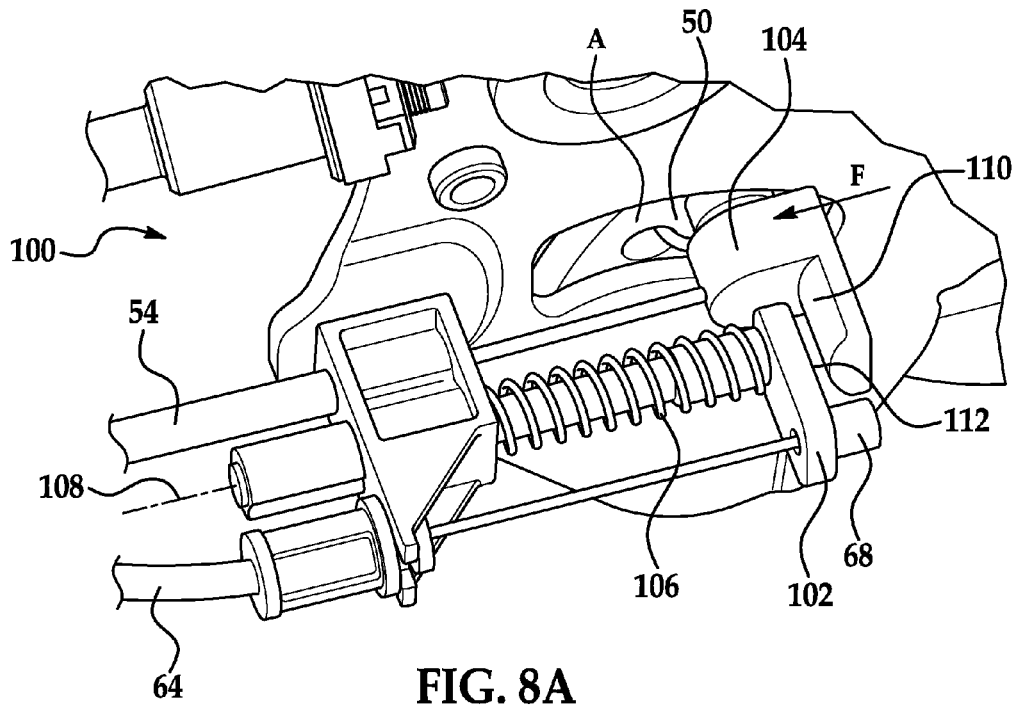
FIGS. 8A and 8B are enlarged perspective views of the latching mechanism shown in FIGS. 4 and 5 showing additional details of the indicating function of the latching mechanism.
Figure 8B:
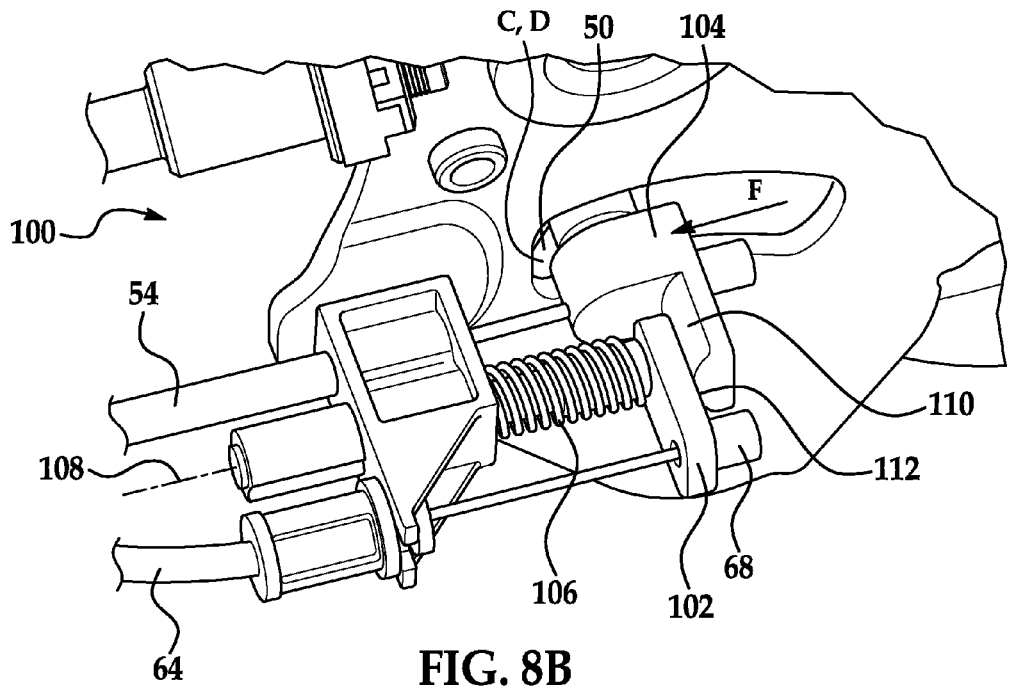

Again referring to FIGS. 4, 5 and 6A-6C, with additional reference to FIGS. 8A and 8B, the indicator 22 can be releasably coupled to the cam 50 by a plunger mechanism 100. As shown in FIGS. 8A and 8B, the second end 68 of the indicator cable 64 is mounted to a plunger 102 positioned adjacent a projection 104 extending from the cam 50. When the cam 50 is in the locked position A, the cam 50 is decoupled from the indicator 22, as shown in FIG. 8A. However, as the cam 50 rotates through the transition position B, and subsequently to the release position C and the over-travel position D, the cam 50 engages the plunger 102 through the projection 104, as shown in FIG. 8B. The cam 50 is thereby coupled to the indicator 22 through the indicator cable 64 and indicator arm 60 as it rotates through the transition position A.

The indicator arm 60 can be mounted about the indicator pin 62 such that the leading edge 80 of the indicator 22 is initially substantially adjacent the peripheral edge 82 of the indicator window 24, as shown in FIG. 6A, when the cam 50 is in the locked position A and disengaged from the plunger 102. Additionally, a spring 106 can be disposed about the plunger 102. The spring 106 is arranged to bias the indicator 22 towards a position indicative of the locked state of the latching mechanism 18. As shown, the spring 106 applies a pulling force to the second end 68 of the indicator cable 64 through the plunger 102. The pulling force is applied to the indicator arm 60 through the first end 66 of the indicator cable 64, which biases the movement of the indicator arm 60 to position the indicator 22 out of alignment with the indicator window 24 to indicate the locked state of the latching mechanism 18.

As the cam 50 rotates from the locked position A through the transition position B, the cam 50 engages the plunger 102 through the projection 104 to couple the cam 50 to the indicator 22, such that the indicator 22 is responsive to the rotational movement of the cam 50. As the cam 50 rotates through the transition position B, and subsequently to the release position C and the over-travel position D, the cam force F is applied to the indicator arm 60 through the indicator cable 64. The indicator arm 60 transitionally positions the indicator 22 into alignment with the indicator window 24 to ultimately indicate the released state of the latching mechanism 18, as shown in FIGS. 6B and 6C.

The illustrated plunger 102 is configured for linear movement along a plunger axis 108, while the projection 104 is configured for rotational movement corresponding to the rotational movement of the cam 50. The movement of the projection 104 generally follows the plunger axis 108. However, because the movement of the projection 104 is rotational, its movement also includes a component transverse to the plunger axis 108. The illustrated projection 104 includes an arcuate surface 110 for contacting a flat surface 112 of the plunger 102, such that engagement is maintained between the plunger 102 and the projection 104 as the cam 50 rotates. Although the illustrated plunger 102 includes an arcuate surface 110 and the projection 104 has a flat surface 112, other configurations of the plunger 102 and the projection 104 could be used to maintain engagement between the plunger 102 and the projection 104 as the cam 50 rotates. For example, the plunger 102 could have an arcuate surface for engaging a flat surface of the projection 104, or, both the plunger 102 and the projection 104 could include arcuate surfaces configured for mutual contact. Alternatively, if movement of the projection 104 substantially follows the plunger axis 108, the plunger 102 and the projection 104 could each have flat surfaces configured for mutual contact.

The illustrated implementation of the latching mechanism 18 includes an indicator 22 that can be configured so that movement of the indicator 22 is at least partially responsive to the position of the cam 50, in addition to being responsive to movement of the cam 50 when coupled thereto. However, other arrangements between the cam 50 and the indicator 22 could alternatively allow the indicator 22 to accurately indicate the state of the latching mechanism 18. For example, if movement of the indicator 22 is configured to be responsive solely to movement of the cam 50, the indicator arm 60 can be mounted about the indicator pin 62 such that the leading edge 80 of the indicator 22 is initially spaced from the peripheral edge 82 of the indicator window 24 when the cam 50 is in the locked position A. Then, as the cam 50 is moved from the locked position A to the locked position B, the cam force F can be applied to the indicator arm 60 through the indicator cable 64 to close the initial space between the leading edge 80 and the peripheral edge 82 until the leading edge 80 is substantially adjacent the peripheral edge 82. As the cam 50 moves through the transition position B, indication of the released state of the latching mechanism 18 can be activated when the leading edge 80 of the indicator 22 is advanced past the peripheral edge 82 of the indicator window 24. As the cam 50 subsequently rotates to the release position C and the over-travel position D, the cam force F can be applied to the indicator arm 60 through the indicator cable 64, such that the indicator arm 60 transitionally positions the indicator 22 into alignment with the indicator window 24 to ultimately indicate the released state of the latching mechanism 18.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A latching mechanism for allowing selective attachment and detachment of a vehicle seat, comprising:
    a latch configured for latching and unlatching the seat, the latch being biased to an unlatched condition;
    a lock for locking the latch and releasing the latch, the lock having a locked position, a transition position and a release position and configured for movement from the locked position to the release position through the transition position, wherein on movement of the lock to the release position, the latch is biased for independent movement relative to the lock from a latched condition to the unlatched condition; and
    an indicator responsive to the position of the lock and configured to activate indication that the latch is released only upon movement of the lock through the transition position.

2. The latching mechanism of claim 1, further comprising:
    an operator input, the lock responsive to the operator input to lock and release the latch.

3. The latching mechanism of claim 2, wherein the indicator and the operator input are both situated on a rear surface of the vehicle seat.

4. The latching mechanism of claim 1, wherein the indicator is configured for selective positioning to indicate at least one of a locked state and a released state of the latch.

5. The latching mechanism of claim 4, wherein the indicator is configured to be visible to a user to indicate the released state and is configured to be not visible to the user to indicate the locked state.

6. The latching mechanism of claim 1, wherein the indicator is biased towards a first position indicative of a locked state of the latch and is coupled to the lock such that movement of the lock through the transition position urges the indicator towards a second position indicative of a released state of the latch.

7. The latching mechanism of claim 1, wherein the indicator faces a direction that is perpendicular to a rotational axis of the latch.

8. A seat for a vehicle, comprising:
    a latch configured for movement between a latched condition and an unlatched condition in a first rotational direction about a first rotational axis, the latch being biased for movement towards the unlatched condition;
    a cam configured for selective engagement with the latch for selectively maintaining the latch in a locked state wherein the latch is locked in the latched condition and a released state wherein the latch is released from the latched condition, wherein the cam is configured for movement from a locked position to a release position through a transition position in a second rotational direction about a second rotational axis, wherein the first rotational axis is parallel to the second rotational axis and the first rotational direction is opposite to the second rotational direction, the cam maintaining the latch in the locked state during movement from the locked position to the transition position and releasing the latch to the released state at the release position; and
    an indicator responsive to movement of the cam to activate indication of the released state only upon movement of the cam through the transition position.

9. The seat of claim 8, wherein the cam is biased for movement towards the locked position.

10. The seat of claim 8, further comprising:
    an operator input, the cam responsive to the operator input for movement from the locked position to the release position.

11. The seat of claim 10, wherein the indicator and the operator input are both situated on a rear surface of the seat.

12. The seat of claim 8, wherein the latch is configured for movement between the latched condition and the unlatched condition through selective engagement with a striker.

13. A seat for a vehicle, comprising:
    a latch configured for movement between a latched condition and an unlatched condition, the latch being biased for movement towards the unlatched condition, wherein the latch is configured for movement between the latched condition and the unlatched condition through selective engagement with a striker;

a cam configured for selective engagement with the latch for selectively maintaining the latch in a locked state wherein the latch is locked in the latched condition and a released state wherein the latch is released from the latched condition, wherein the cam is configured for movement from a locked position to a release position through a transition position, the cam maintaining the latch in the locked state during movement from the locked position to the transition position and releasing the latch to the released state at the release position, wherein the cam engages the latch to prohibit movement of the latch out of engagement with the striker to maintain the latch in the locked state and disengages the latch to allow movement of the latch out of engagement with the striker to release the latch to the released state; and an indicator responsive to movement of the cam to activate indication of the released state only upon movement of the cam through the transition position.

14. The seat of claim 8, wherein the indicator is configured for selective positioning to indicate at least one of the locked state and the released state of the latch.

15. The seat of claim 14, wherein the indicator is configured to be visible to a user to indicate the released state and is configured to be not visible to the user to indicate the locked state.

16. The seat of claim 8, wherein the indicator is biased towards a first position indicative of the locked state and is coupled to the cam such that movement of the cam through the transition position urges the indicator towards a second position indicative of the released state.

17. The seat of claim 16, wherein the indicator is configured to indicate the released state in response to a cam force applied by the cam when the cam urges the indicator towards the second position.

18. The seat of claim 8, wherein the indicator is situated both laterally and vertically spaced apart from the cam on a frame of the seat.

19. The seat of claim 8, wherein the indicator faces a direction that is perpendicular to the first rotational axis.

20. The latching mechanism of claim 1, wherein the lock is configured for selective engagement with the latch for locking the latch and releasing the latch, the latch is configured for movement from a latched condition to the unlatched condition in a first rotational direction about a first rotational axis, the lock is configured for movement from the locked position to the release position through the transition position in a second rotational direction about a second rotational axis, and the first rotational axis is parallel to the second rotational axis and the first rotational direction is opposite to the second rotational direction.

* * * * *